United States Patent [19]
Storey et al.

[11] Patent Number: 5,588,670
[45] Date of Patent: Dec. 31, 1996

[54] SEAT STRUCTURE PRESSURE VESSEL FOR AIRBAG INSTALLATION

[75] Inventors: J. Kirk Storey, Farmington; Brent K. Olson, Clearfield, both of Utah

[73] Assignee: Morton International, Inc., Chicago, Ill.

[21] Appl. No.: 503,884

[22] Filed: Jul. 20, 1995

[51] Int. Cl.$^6$ ............................................. B60R 21/22
[52] U.S. Cl. ................................ 280/730.2; 280/737
[58] Field of Search ........................ 280/748, 730.1, 280/730.2, 728.1, 737, 741, 731

[56] References Cited

U.S. PATENT DOCUMENTS

| | | | |
|---|---|---|---|
| 3,632,132 | 1/1972 | Richardson | 280/728.1 |
| 3,927,901 | 12/1975 | Weman | 280/730.1 |
| 4,966,388 | 10/1990 | Warner et al. | 280/730 |
| 5,072,966 | 12/1991 | Nishitake et al. | 280/730 |
| 5,112,079 | 5/1992 | Haland et al. | 280/730.2 |
| 5,154,445 | 10/1992 | Weller | 280/751 |
| 5,161,821 | 11/1992 | Curtis | 280/730 |
| 5,224,732 | 7/1993 | Warner et al. | 280/730 |
| 5,273,309 | 12/1993 | Lau et al. | 280/730 A |
| 5,277,441 | 1/1994 | Sinnhuber | 280/730 R |
| 5,482,315 | 1/1996 | Chandler et al. | 280/730.2 |
| 5,498,030 | 3/1996 | Hill et al. | 280/728.1 |
| 5,499,840 | 3/1996 | Nakano | 280/730.1 |
| 5,503,428 | 4/1996 | Awotwi et al. | 280/730.2 |

FOREIGN PATENT DOCUMENTS 4209944  5/1993  Germany ............................ 280/730.2

*Primary Examiner*—Paul N. Dickson
*Attorney, Agent, or Firm*—George W. Rauchfuss, Jr.; Gerald K. White

[57] ABSTRACT

The structural framework of an automotive chair serves as the reservoir for airbag-inflating gas. Accordingly, the need for a separate gas reservoir for each airbag installation is eliminated.

7 Claims, 2 Drawing Sheets

SEAT STRUCTURE PRESSURE VESSEL FOR AIRBAG INSTALLATION

TECHNICAL FIELD

This invention relates to automotive airbag installations. More particularly, it relates to such installations wherein a portion of the automotive chair structure serves as one element of an airbag installation.

BACKGROUND ART

One type of automotive airbag installation requires a reservoir of compressed gas which serves as the airbag inflating medium. One problem with airbag installations of this type is that room must be found for the pressurized gas reservoir. Another problem is that the reservoir adds weight to the vehicle which it would be desirable to avoid. These become particular problems as airbag locations proliferate. For example, airbags may be positioned to deploy within the regions between the vehicle chairs and the doors, both front and rear. (The term "chair" is used herein and in the appended claims to denote the combination of seat and back.) They may also be positioned to deploy into the space immediately behind the front chair backs to protect the heads of rear seat passengers.

Accordingly, it is a primary object of the present invention to provide an airbag installation of the pressurized reservoir type which does not require a dedicated reservoir separate from the normal automotive structural components. Other objects, features, and advantages will become apparent from the following description and appended claims.

DISCLOSURE OF INVENTION

In accordance with the present invention, the normal structural components of an automotive chair serve as the pressurized gas reservoir. More particularly, the hollow tubing which serves as the chair framework is utilized as the pressurized gas reservoir.

BEST MODE FOR CARRYING OUT THE INVENTION

Figure 1:
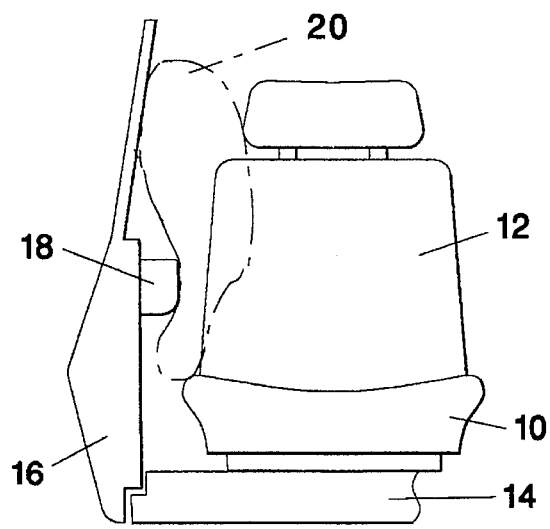
FIG. 1 is a front view illustrating an automotive chair with an airbag deployed between the chair and the vehicle door.
Figure 2:
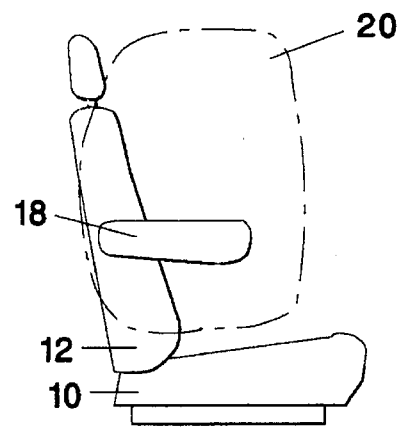
FIG. 2 is a side view of the chair of FIG. 1 with the door removed.
Figure 3:
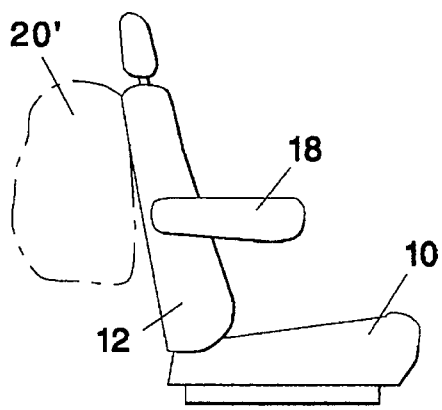
FIG. 3 is an illustration similar to FIG. 2 illustrating an automotive front chair with an airbag deployed in the space behind the chair back.

FIGS. 1 and 2 illustrate an automotive chair structure having a side-impact airbag installation. The chair comprises a seat 10 and a back 12 mounted in conventional fashion on a vehicle floor 14 adjacent a door 16. The door 16 carries a conventional armrest 18. In order to protect the chair occupant against side impact collisions, it would be desirable to install an airbag module in such a position as to permit deployment of an airbag 20 into a location between the occupant of the chair and the door 16. FIG. 3 illustrates in similar fashion a chair having an airbag 20, which deploys behind the chair back 12 to protect rear seat occupants.

Figure 4:
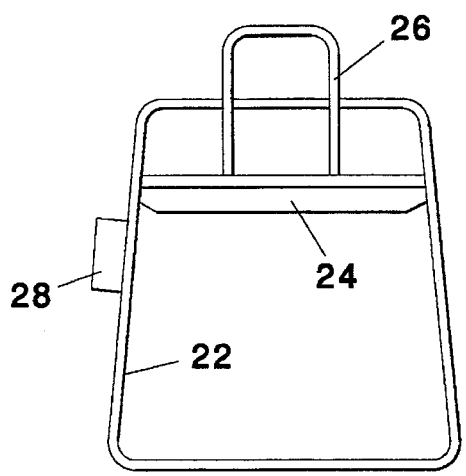
FIG. 4 illustrates the steel tubing framework of an automotive chair back with an airbag module connected thereto.

In accordance with the present invention, a portion of the normal chair structure is employed as a pressurized gas reservoir for airbag inflation. One method of achieving this result is illustrated in FIG. 4. FIG. 4 illustrates a chair back framework 22 which comprises a continuous hollow steel tubing structure. The framework 22 may include additional structural elements such as a strengthening member 24 and a headrest frame 26. Other elements such as springs, padding, and upholstery are conventional and do not form a part of this invention. In this illustrated embodiment, the framework 22 is a closed system containing stored inflation gas.

Connected to the framework 22 is an airbag module 28 which serves to release a side impact airbag as illustrated in FIGS. 1 and 2. It will be understood that the relative location of the module 28 around the framework 22 may be varied depending upon the desired deployment location of the airbag. That is, the module 28 may be positioned on the framework 22 in a location to provide, for example, side deployment as shown in FIGS. 1 and 2 or rear deployment as in FIG. 3.

Figure 5:
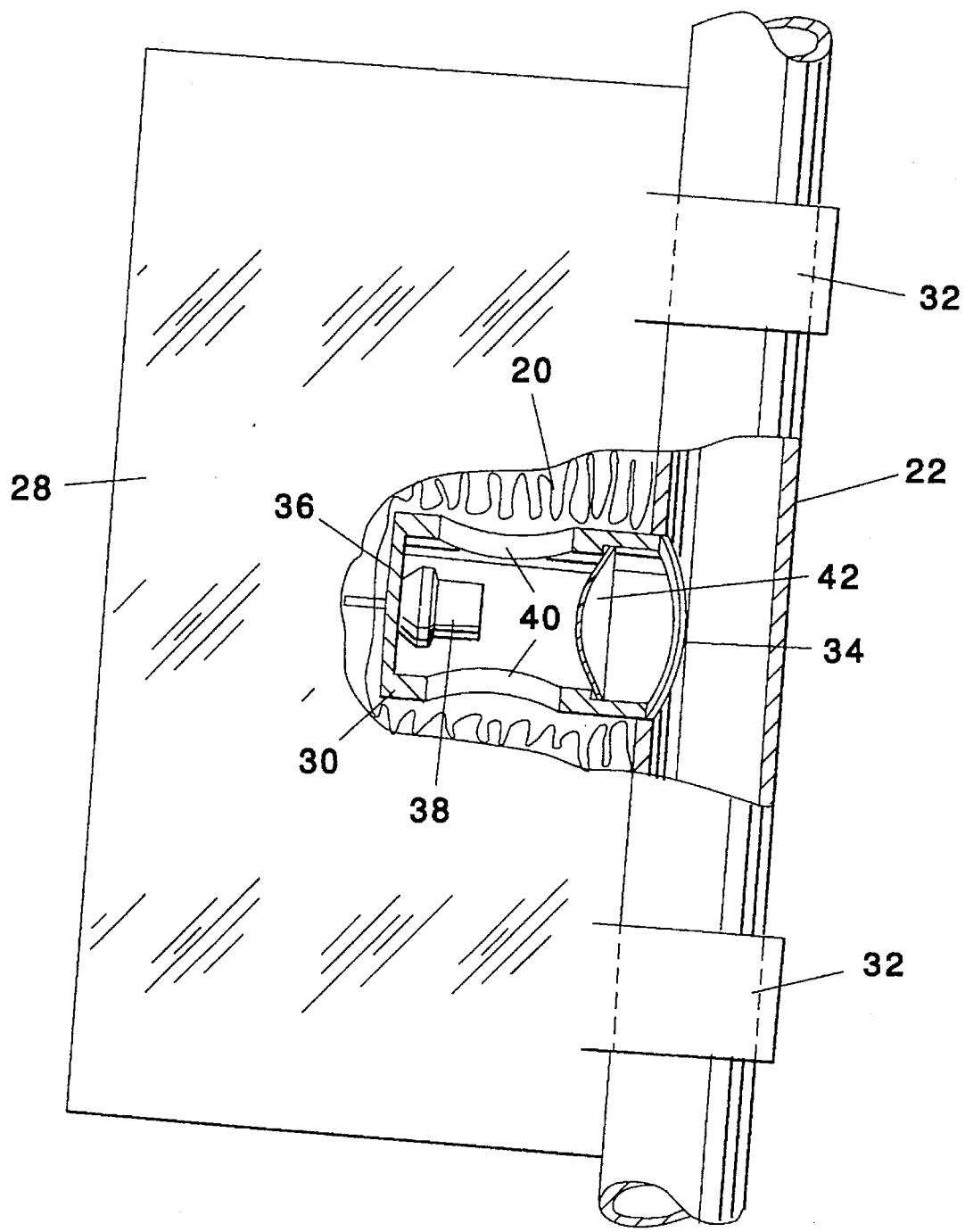
FIG. 5 is a greatly enlarged detail of the airbag module of FIG. 4 illustrating its connection with the tubular framework of the chair back.

FIG. 5 illustrates in detail the manner in which the module 28 is secured to the hollow tubular framework 22. The module 28 is relatively conventional in that it includes a folded airbag 20 having a mouth portion which surrounds a substantially cylindrical diffuser 30. As illustrated, the module 28 is secured to the tubular framework 22 by means of clamps 32. The diffuser 30 has an open inlet end 34 which is welded, or otherwise gas-tightly joined, to a matching opening in the tubular framework 22. Mounted to the closed upper end 36 of the diffuser 30 is a squib 38. A plurality of diffuser openings 40 are provided in the sidewall of the diffuser 30. The portion of the diffuser housing the squib 38 is separated from the open end 34 of the diffuser by means of a burst disk 42. The functioning of these elements of the invention is conventional and need not be described in detail. It will be understood that the firing of the squib 38 will overpressurize and burst the disk 42, permitting pressurized gas to flow from the reservoir formed by framework 22, through the diffuser openings 40, and into the mouth of the folded) airbag 20. Upon inflation, the airbag 20 will burst from the module 28 into the adjacent space or through an appropriate openable seam in the seat or back, thereby providing protection to the occupants.

It will now be apparent that by means of the present invention, all the safety features of a conventional airbag are provided without the need for providing a separate pressurized gas reservoir for each airbag to be installed. It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. In a motor vehicle having passenger chairs therein including at least one air bag module, an inflation initiator and a pressurized inflation-gas, the improvement comprising:

at least one of said chairs having a structural framework, said framework storing said pressurized inflation-gas, said at least one air bag module and said initiator mounted to and substantially externally on said framework.

2. The improvement of claim 1 wherein said structural framework comprises:

hollow tubing forming a framework for said at least one chair.

3. The improvement of claim 2 wherein said framework is in the seat back.

4. The improvement of claim 2 wherein said module is positioned to release an airbag into the space beside the chair.

5. The improvement of claim 2 wherein said module is positioned to release an airbag into the space behind the chair.

6. The improvement of claim 3 wherein said module is positioned to release an airbag into the space beside the chair.

7. The improvement of claim 3 wherein said module is positioned to release an airbag into the space behind the chair.

* * * * *